(12) United States Patent
Yoon et al.

(10) Patent No.: US 10,844,853 B2
(45) Date of Patent: Nov. 24, 2020

(54) INTAKE PULSATION DAMPER OF SWASH PLATE-TYPE COMPRESSOR

(71) Applicant: Hanon Systems, Daejeon (KR)

(72) Inventors: Young Seop Yoon, Daejeon (KR); Seung Taek Lim, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 15/780,565

(22) PCT Filed: Jun. 27, 2017

(86) PCT No.: PCT/KR2017/006762
§ 371 (c)(1),
(2) Date: May 31, 2018

(87) PCT Pub. No.: WO2018/038377
PCT Pub. Date: Mar. 1, 2018

(65) Prior Publication Data
US 2019/0170131 A1    Jun. 6, 2019

(30) Foreign Application Priority Data

Aug. 24, 2016 (KR) .......................... 10-2016-0107492

(51) Int. Cl.
*F04B 49/22* (2006.01)
*F04B 27/18* (2006.01)
(Continued)

(52) U.S. Cl.
CPC ........ *F04B 49/225* (2013.01); *F04B 27/1009* (2013.01); *F04B 27/1804* (2013.01);
(Continued)

(58) Field of Classification Search
CPC .............. F04B 27/1804; F04B 27/1009; F04B 2027/1818; F04B 2027/1881;
(Continued)

(56) References Cited

U.S. PATENT DOCUMENTS 5,546,981 A * 8/1996 Li .......................... F16K 15/028
                                                             137/493.3
6,089,262 A * 7/2000 Hart ...................... B60T 11/326
                                                            137/543.19
(Continued)

FOREIGN PATENT DOCUMENTS

CN          101283147 A     10/2008
JP          2004-028043 A    1/2004
(Continued)

OTHER PUBLICATIONS

International Search Report issued in PCT/KR2017/006762 dated Oct. 25, 2017.

*Primary Examiner* — Peter J Bertheaud
(74) *Attorney, Agent, or Firm* — Norton Rose Fulbright US LLP (57) ABSTRACT

The present invention relates to a suction pulsation reducing device of a swash plate type compressor, and more particularly, to a suction pulsation reduction apparatus provided on a suction channel formed in a rear head of a swash plate type compressor, in which a moving range of a core portion is limited and all parts to be mounted on a suction channel are integrally formed in a case.

10 Claims, 12 Drawing Sheets

(51) Int. Cl.
    *F04B 27/10* (2006.01)
    *F04B 53/10* (2006.01)
    *F16K 15/02* (2006.01)
    *F04B 39/00* (2006.01)
    *F16K 27/02* (2006.01)

(52) U.S. Cl.
    CPC ...... *F04B 39/0055* (2013.01); *F04B 53/1022* (2013.01); *F04B 53/1027* (2013.01); *F16K 15/026* (2013.01); *F16K 27/0209* (2013.01); *F04B 2027/1818* (2013.01); *F04B 2027/1881* (2013.01); *Y10T 137/7937* (2015.04); *Y10T 137/7938* (2015.04)

(58) Field of Classification Search
    CPC ............... F04B 53/102; F04B 53/1022; F04B 53/1027; F04B 49/225; F04B 39/0055; Y10T 137/7938; Y10T 137/7929; Y10T 137/7937; F16K 15/026; F16K 15/028; F16K 15/025; F16K 17/04; F16K 17/0413; F16K 17/0466; F16K 27/0209
    See application file for complete search history.

(56) References Cited

U.S. PATENT DOCUMENTS

| | | | | |
|---|---|---|---|---|
| 6,520,751 B2* | 2/2003 | Fujita | ................ | F04B 27/1804 137/513.3 |
| 6,978,801 B2* | 12/2005 | Takahashi | ............ | F16K 15/026 137/538 |
| 8,276,613 B2* | 10/2012 | Park | ...................... | F16K 15/026 137/516.25 |
| 8,276,614 B2* | 10/2012 | Park | ...................... | F04B 27/1018 137/535 |
| 8,529,219 B2* | 9/2013 | Takai | ................ | F04B 27/1009 417/295 |
| 8,671,976 B2* | 3/2014 | Park | ................... | F04B 27/1009 137/543.19 |
| 9,004,099 B2* | 4/2015 | Kim | ...................... | F04B 25/04 137/513.5 |
| 10,591,074 B2* | 3/2020 | Horvath | ............. | F16K 17/0433 |

FOREIGN PATENT DOCUMENTS

| | | |
|---|---|---|
| JP | 2008-223696 A | 9/2008 |
| KR | 2009-0062751 A | 6/2009 |
| KR | 2012-0133206 A | 12/2012 |
| KR | 2014-0053735 A | 5/2014 |
| KR | 2015-0080400 A | 7/2015 |
| KR | 10-1603091 B1 | 3/2016 |

* cited by examiner

INTAKE PULSATION DAMPER OF SWASH PLATE-TYPE COMPRESSOR

This application is a § 371 of International Application No. PCT/KR2017/006762 filed Jun. 27, 2017, and claims priority from Korean Patent Application Nos. 10-2016-0107492 filed Aug. 24, 2016.

TECHNICAL FIELD

The present invention relates to a suction pulsation reducing device of a swash plate type compressor, and more particularly, to a suction pulsation reduction apparatus provided on a suction channel formed in a rear head of a swash plate type compressor, in which a moving range of a core portion is limited and all parts to be mounted on a suction channel are integrally formed in a case.

BACKGROUND ART

Generally, a compressor serving to compress a coolant in a vehicle cooling system has been developed in various forms. In such a compressor, there is a reciprocating type in which compression is performed while a coolant compressing structure is reciprocating, and a rotary type in which compression is performed while rotating. In the reciprocating type, there are a crank type in which a driving force of a driving source is transmitted to a plurality of pistons by using a crank, a swash plate type in which the driving force is transmitted to a rotary shaft on which a swash plate is installed, and a wobble plate type using a wobble plate, and in the rotary type, there are a vane rotary type using a rotating rotary shaft and vane, and a scroll type using an orbiting scroll and a fixed scroll.

Among various types of compressors described above, the swash plate type compressor is driven according to on/off of an air conditioner switch. When the compressor is driven, the temperature of the evaporator falls and when the compressor stops, the temperature of the evaporator rises.

On the other hand, as the swash plate type compressor, there are a fixed displacement type and a variable displacement type. These compressors are driven by receiving power from a torque of an engine of a vehicle. In the fixed displacement type, an electromagnetic clutch is provided to control the operation of the swash plate type compressor. However, in the case of the fixed displacement type having the electromagnetic clutch, there is a problem that the RPM of the vehicle varies when the compressor is driven or stops to hinder a stable vehicle operation.

Therefore, in recent years, the variable displacement type which does not have a clutch, is always driven with the drive of the engine of the vehicle, and changes an inclination angle of the swash plate to change a discharge capacity has been widely used. In such a variable displacement swash plate type compressor, a pressure control valve for adjusting the inclination angle of the swash plate is generally used to control the discharge amount of the coolant.

As the related art, there is Korean Patent Laid-Open Publication No. 10-2009-0062751 (published on Jun. 17, 2009, entitled "Variable Displacement Swash Type Compressor").

By the way, in the case of the existing variable displacement swash plate type compressor, when a suction amount of the coolant decreases, there is a problem that vibration occurs in a suction port to cause pulsation or noise.

Figure 1:
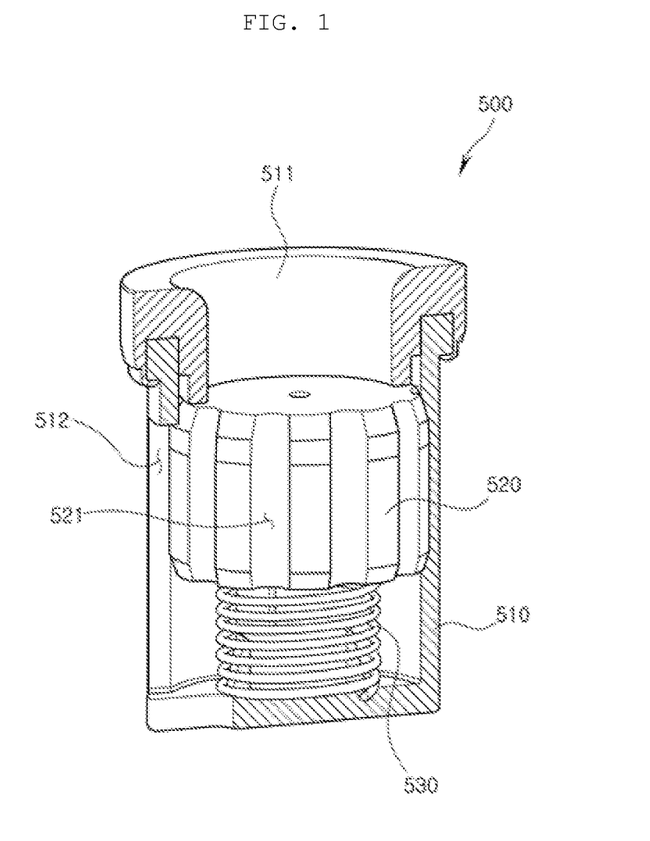
FIG. 1 is a longitudinal perspective view of the existing suction pulsation reduction apparatus.
Figure 2:
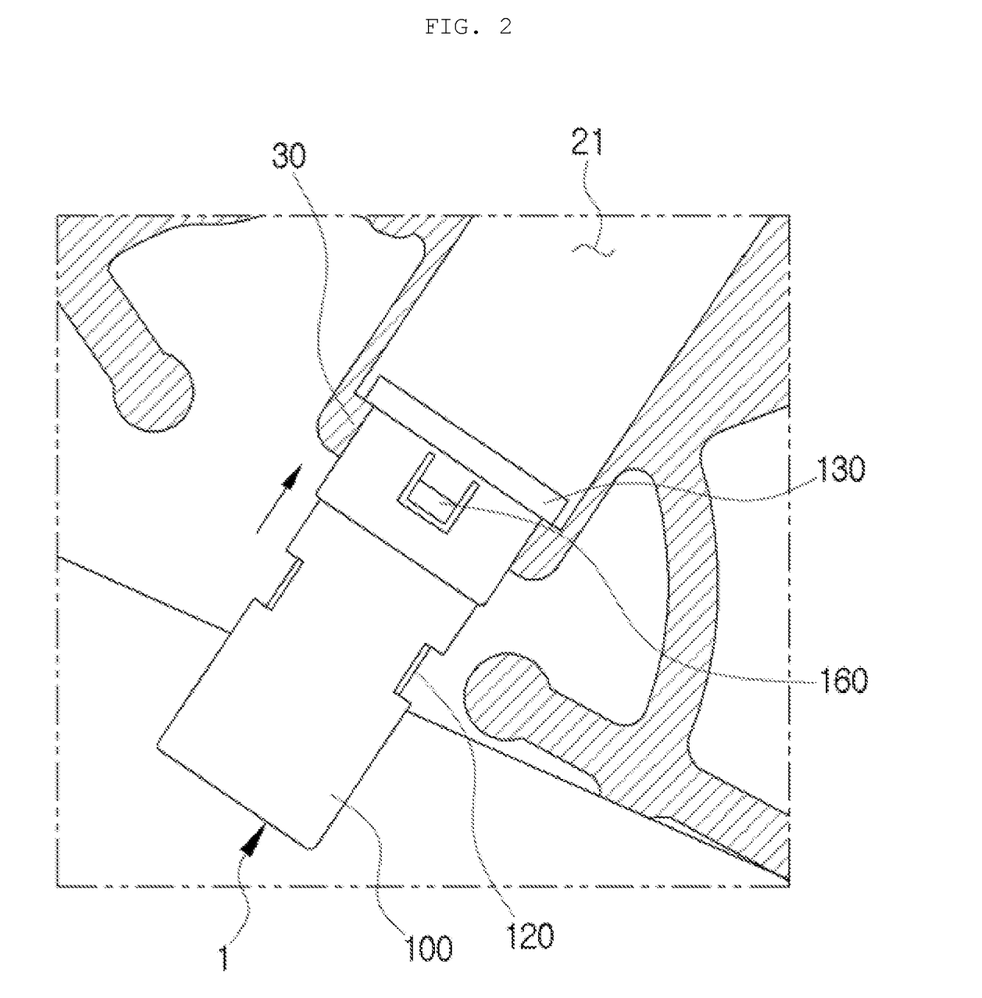
FIG. 2 is a front view of a suction pulsation reduction apparatus according to an exemplary embodiment of the present invention, and is a diagram illustrating a state in which the suction pulsation reduction apparatus is mounted on a suction channel.

In order to solve such a problem, an opening/closing valve 500 has been proposed in FIG. 1 in order to avoid the sudden suction by smoothly changing a flow area of a suction port when the suction amount of coolant decreases.

The opening/closing valve 500 includes a case 510, an opening/closing core 520, and an elastic spring 530. The case 510 has an inlet 511 opened at an upper end thereof and an outlet 512 formed at one side of a side wall surface, with the outlet being formed at a right angle to the inlet 511.

The opening/closing core 520 is a cylindrical plunger movably installed axially within the case 510, and serves to control the flow of the coolant from the inlet 511 to the outlet 512 while moving vertically within the case 510 according to a pressure of the coolant applied to the inlet 511.

The elastic spring 530 may be installed to elastically support the opening/closing core 520 against the pressure of the coolant flowing into the case 510 through the inlet 511, and adhere the opening/closing core 520 to the inlet 511 when the pressure of the coolant is not applied to the inlet 511 to close the inlet 511.

In addition, since an outer circumferential surface of the opening/closing core 520 is provided with an axial groove 521, the coolant may flow through the axial groove 521 even when the opening/closing core 520 is in close contact with the inlet 511. As a result, even if there is a sudden change in the pressure of the coolant applied to the inlet 511, a sudden opening change of the suction pulsation reduction apparatus may be prevented.

However, in the case of the existing suction check valve 500 as described above, a cover made of a metal material or a cover formed to have a coupling structure is applied for installation in the compressor while restricting the movement of the opening/closing core 520.

Accordingly, when the cover made of the metal material is applied, the suction check valve 500 is installed inside the compressor by press fitting, and when the cover formed to have the coupling structure is applied, the suction check valve 500 is installed in the compressor by the press fitting.

However, only the spring and the core are required to perform the suction pulsation reduction which is the greatest role of the suction check valve. However, in order to support or configure the parts, separate parts such as the case and the cover made of the metal material are required, thereby increasing the assembling man-hour and the manufacturing cost.

RELATED ART DOCUMENT

Patent Document

Korean Patent Laid-Open Publication No. 10-2009-0062751 (Published on Jun. 17, 2009, entitled: Variable Displacement Type Swash Plate type Compressor)

DISCLOSURE

Technical Problem

An object of the present invention is to provide a suction pulsation reduction apparatus installed on a suction channel formed in a rear head of a swash plate type compressor, in which all parts restricting a moving range of a core portion and being mounted on the suction channel are integrally formed in a case to simplify a structure and facilitate assembling.

Another object of the present invention is to provide a suction pulsation reduction apparatus capable of cost reduction by manufacturing a case with a plastic injection method.

Still another object of the present invention is to provide a suction pulsation reduction apparatus capable of preventing a rotation when a coolant is sucked by installing a latching portion of a case on a groove protruding on a suction channel and forming a hook latching portion depressed inwardly on a groove at a position corresponding to a body hook portion formed on an outer circumferential surface of the case.

Technical Solution

In one general aspect, a suction pulsation reduction apparatus 1 provided on a suction channel 21 formed in a rear head of a swash plate type compressor includes: a case 100 including an inlet 110 located at a suction port 20 side and having one side opened in a longitudinal direction, an outlet 120 formed by making a predetermined region on an outer circumferential surface of the case 1 hollow, and a latching portion 130 protruding outwardly from the outer circumferential surface of the end of the case 100; a core portion 200 moving in a longitudinal direction in the case 100 according to the suction pressure of the coolant introduced from the inlet 110 to control an opening/closing area of the inlet 110; and an elastic spring 300 inserted into the case 100 and seated on the other side surface of the case 100 to elastically support the core portion 200.

The suction pulsation reduction may further include: a core hook portion 140 protruding inwardly in a predetermined region on an inner circumferential surface of the case 100; and a hook moving groove 210 extending in a longitudinal direction on an outer circumferential surface of the core portion 200 at a position corresponding to the core hook portion 140 and depressed inwardly.

The hook moving groove 210 may extend from a point spaced by a predetermined distance from the other end in the longitudinal direction of the core portion 200.

A predetermined region of one end of the core portion 200 which is located at the inlet 110 side may be provided with a chamfer portion 220 formed to have a diameter gradually reducing.

The case 100 may be integrally formed with the core hook portion 140 by injection molding.

The core hook portion 140 may protrude at a point spaced by a predetermined distance from the other end in the longitudinal direction of the case 100, and the distance spaced from the other end may be equal to or shorter than a length of the hook moving groove 210.

The suction pulsation reduction apparatus may further include: a core guide 150 protruding inwardly in a predetermined region on an inner circumferential surface of the case 100 and extending from one side to the other side in the longitudinal direction, and a guide moving groove 230 extending in a longitudinal direction on an outer circumferential surface of the core portion 200 at a position corresponding to the core guide 150 and depressed inwardly.

The number of core guides 150 and the number of core hook portions 140 may be at least one.

The core guide 150 and the core hook portion 140 may be disposed at positions corresponding to each other with respect to a center of the core portion 200 on the outer circumferential surface of the core portion 200.

The latching portion 130 may protrude outwardly along an edge of one end of the case 100, and protrude while being spaced at regular intervals in a circumferential direction.

The suction pulsation reduction apparatus may further include: a body hook portion 160 protruding outwardly in a predetermined region on the outer circumferential surface of the case 100 and further protruding gradually toward the inlet 110.

The number of body hook portions 160 may be at least one.

In another general aspect, there is provided a swash plate type compressor including the suction pulsation reduction apparatus 1 as described above, wherein a latching portion 130 may be seated on a groove 30 protruding on a suction channel 21, and a body hook portion 160 may be latched to a hook coupling portion 31 in which the groove 30 at a position corresponding to the body hook portion 160 of the case 100 is depressed inwardly.

Advantageous Effects

According to the suction pulsation reduction apparatus of the swash plate type compressor according to the present invention, the moving range of the core portion is limited and the parts being mounted on the suction channel are integrally formed within the case, thereby simplifying the structure and facilitating assembling.

Further, according to the suction pulsation reduction apparatus according to the exemplary embodiment of the present invention, the case can be integrally manufactured by the plastic injection method to reduce the material and assembling costs, thereby reducing the costs.

More specifically, according to the suction pulsation reduction apparatus according to the exemplary embodiment of the present invention, the core portion may be supported by core hook portion inwardly protruding on the inner circumferential surface of the case without separating from the case even when the coolant suction is not performed, and an edge of an end of the suction port side of the case can be seated on the groove formed on the suction channel by the latching portion protruding outwardly, such that the case can replace the role of the existing cover.

In addition, in the suction pulsation reduction apparatus according to the exemplary embodiment of the present invention, when the core portion moves, the core guide capable of supporting the core portion is separately configured in the moving direction, thereby preventing the unstable behavior due to rotation.

In addition, according to the exemplary embodiment of the present invention, it is possible to prevent the rotation when the coolant is sucked by installing the latching portion of the case on a groove protruding on the suction channel and forming the hook latching portion depressed inwardly on the groove at the position corresponding to the body hook portion formed on the outer circumferential surface of the case.

BEST MODE

Hereinafter, a suction pulsation reduction apparatus of a swash plate type compressor according to an exemplary embodiment of the present invention will be described in detail with reference to the accompanying drawings.

First, a structure of a swash plate type compressor will be briefly described. The swash plate type compressor largely includes a housing 10, a rotary shaft, a swash plate, and a plurality of pistons.

The housing 10 is formed as an outer body of the swash plate type compressor. The housing 10 has a rotary shaft, a swash plate, and a cylinder chamber accommodating a plurality of pistons, and a rear head thereof is provided with a suction channel 21 through which a coolant is supplied to the cylinder chamber during a suction stroke and a discharge channel through which the coolant in the cylinder chamber is discharged during a compression stroke.

The rotary shaft is a means for transmitting a rotational driving force of an external driving source into a compressor, and the swash plate is a means for converting the rotational driving force of the rotary shaft into a reciprocating linear motion of the piston and inclinedly mounted on the rotary shaft to rotate together with the rotary shaft.

Particularly, a variable displacement swash plate type compressor is installed so that an inclination angle of the swash plate varies. When the inclination of the swash plate with respect to the rotary shaft is 90°, the reciprocating motion of the piston disappears, and therefore the rotary shaft is in an idle state. In contrast, if the swash plate is inclined with respect to the rotary shaft, the piston reciprocates in the cylinder chamber to compress a coolant.

The plurality of pistons are means for compressing the coolant while reciprocating in the cylinder chamber by the swash plate and discharge the coolant sucked into the cylinder chamber through the suction channel 21 to an external coolant line through a discharge channel.

At this time, an end of the suction channel 21 is provided with a suction port 20 into which the coolant is introduced from the outside. The suction pulsation reduction apparatus 1 according to the exemplary embodiment of the present invention is mounted on the suction channel 21, thus a core portion 200 moves according to a suction pressure and a suction pulsation is controlled.

The suction pulsation reduction apparatus 1 largely includes a case 100, the core portion 200, and an elastic spring 300.

The case 100 has a substantially cylindrical shape, and includes an inlet 110 located at the suction port 20 side and having one side opened in a longitudinal direction, an outlet 120 formed by making a predetermined region on an outer circumferential surface hollow, and a latching portion 130 having an edge of one end protruding outwardly.

Figure 3:
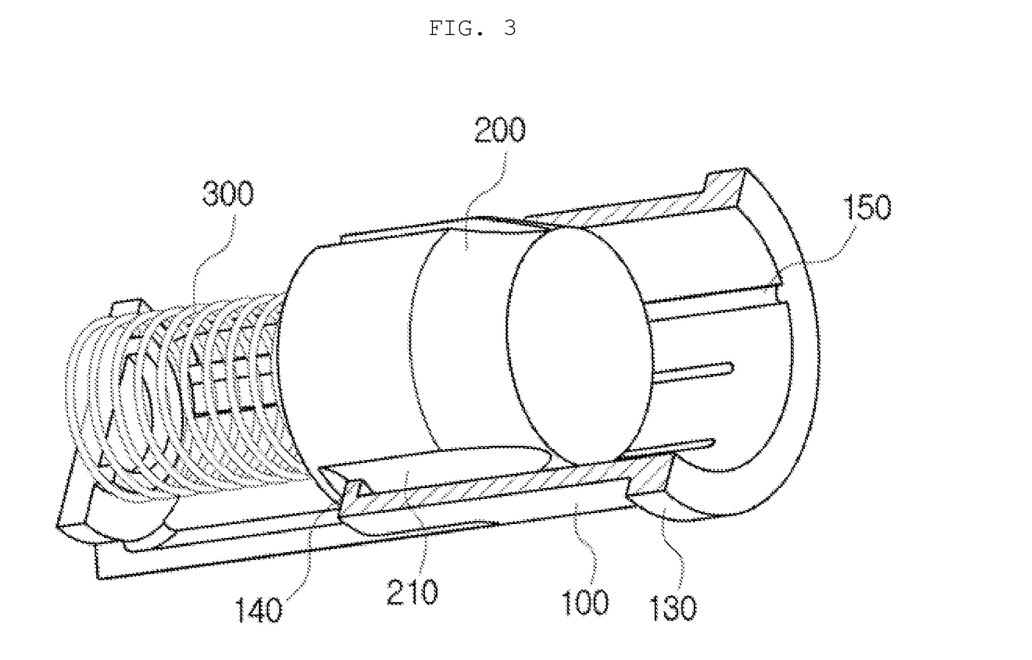
FIG. 3 is a longitudinal perspective view of the suction pulsation reduction apparatus according to the exemplary embodiment of the present invention.

Referring to FIG. 3, the case 100 has a shape in which one side surface of the suction port 20 side is open and the other side surface thereof is partially closed, and an outer circumference of the case 100 is provided with a plurality of outlets 120 at regular intervals.

The latching portion 130 protruding from the outer side of the case 100 is configured to be latched to the groove 30 protruding on the suction channel 21. Conventionally, the latching portion 130 is manufactured as a separate part made of a metal material. However, in the present invention, the latching portion 130 is made of a plastic material and is formed integrally with a body by injection molding.

Figure 12:
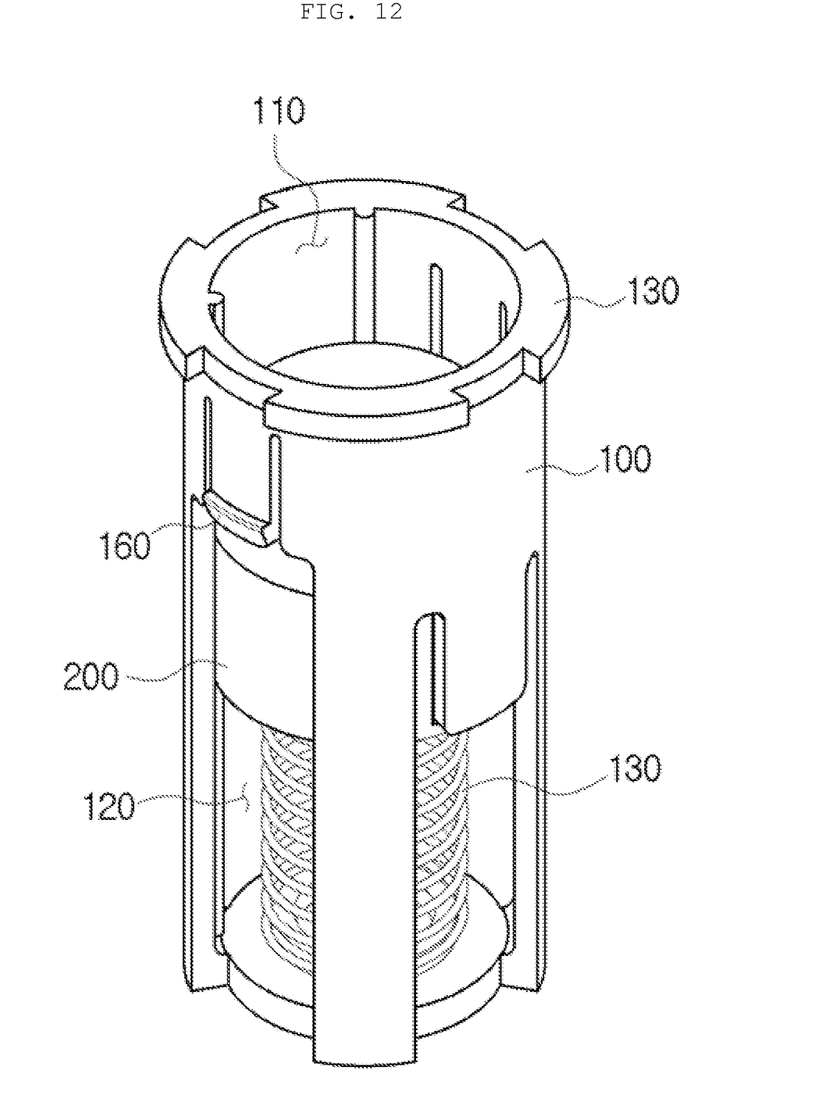
FIG. 12 is a perspective view of a suction pulsation reduction apparatus according to another exemplary embodiment of the present invention.

In this case, the latching portion 130 is configured to be latched to the groove 30. As illustrated in FIG. 3, the latching portion 130 may be formed along the whole of an edge, and as illustrated in FIG. 12, may be formed at the edge at regular intervals.

The core portion 200 moves in a longitudinal direction within the case 100 according to the suction pressure of the coolant introduced from the inlet 110 to control an opening/closing area of the inlet 110.

That is, the core portion 200 is a means for controlling the flow of the coolant passing through the inside of the case 100. The core portion 200 controls the opening/closing area of the inlet 110 and the outlet 120 of the case 100 while reciprocating axially according to the pressure of the coolant introduced through the inlet 110 of the case 100.

The core portion 200 is formed in a cylindrical shape capable of reciprocating in the longitudinal direction within the case 100. A predetermined region of an end of the inlet 110 side is provided with a chamfer portion 220 having a diameter gradually reducing toward the inlet 110 side.

As described above, the core portion 200 reciprocates axially according to the suction pressure of the coolant, and a side surface opposite to the inlet 110 side is elastically supported by the elastic spring 300 which is inserted into the case 100 to be seated.

When the suction pressure of the coolant is less than a tensile force of the elastic spring, the core portion 200 may be bounced toward the inlet 110 to be spaced apart from the case 100, and therefore a means for supporting the core portion 200 in an opposite direction to the tensile force of the elastic spring is required.

Accordingly, the suction pulsation reduction apparatus 1 according to the exemplary embodiment of the present invention includes a core hook portion 140 protruding inwardly in a predetermined region on an inner circumferential surface of the case 100 and a hook moving groove 210 extending in a longitudinal direction on the outer circumferential surface of the core portion 200 at the position corresponding to the core hook portion 200 and being depressed inwardly.

At this time, the hook moving groove 210 extends from a point spaced by a predetermined distance from the other end in the longitudinal direction, such that the core portion 200 is supported by hooking the core hook portion 140 to the end of the hook moving groove 210 when the coolant suction is not made.

Further, the core hook portion 140 protrudes at a point spaced from the other end in the longitudinal direction of the case 100 at a predetermined distance, and the distance spaced from the other end is equal to or shorter than a length of the hook moving groove 210, and therefore it is preferable that the core portion 200 may smoothly move axially within the case 100.

Figure 4:
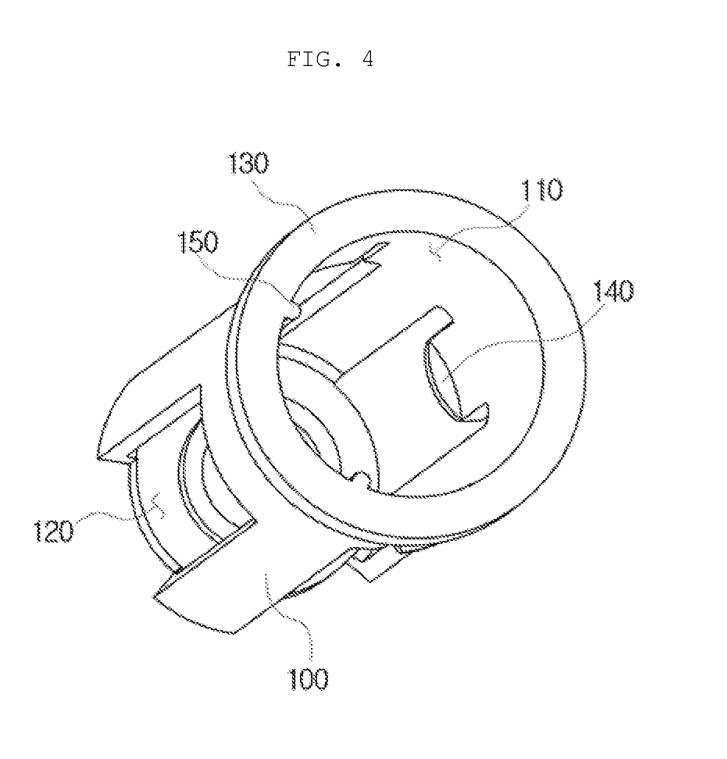
FIG. 4 is a perspective view of a case of the suction pulsation reduction apparatus according to the exemplary embodiment of the present invention.
Figure 5:
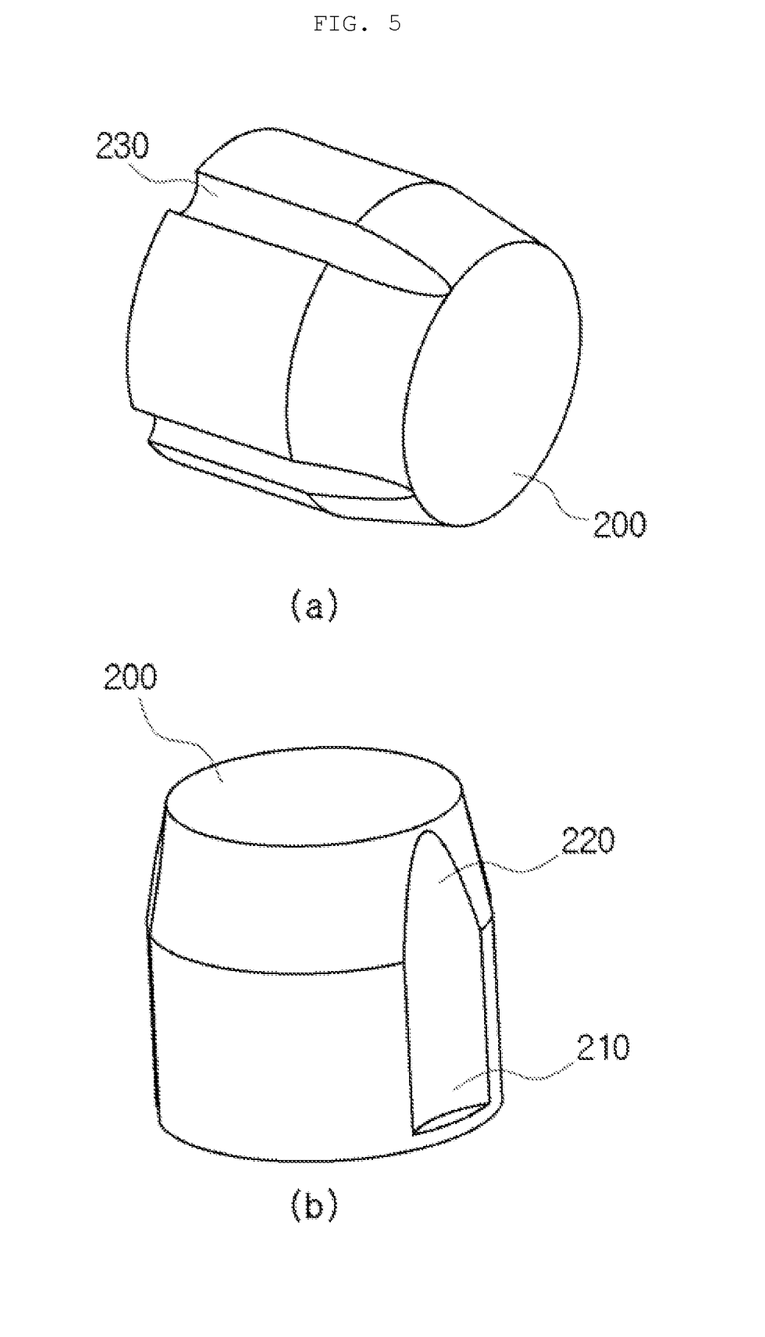
FIGS. 5 and 6 are a plan view and a perspective view illustrating a core portion of the suction pulsation reduction apparatus according to the exemplary embodiment of the present invention.
Figure 6:
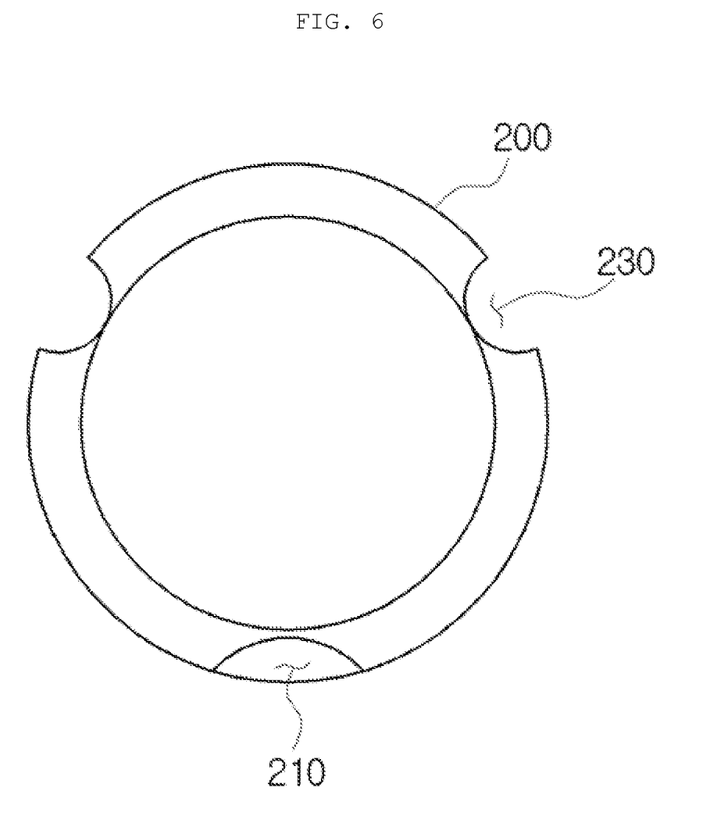
Figure 7:
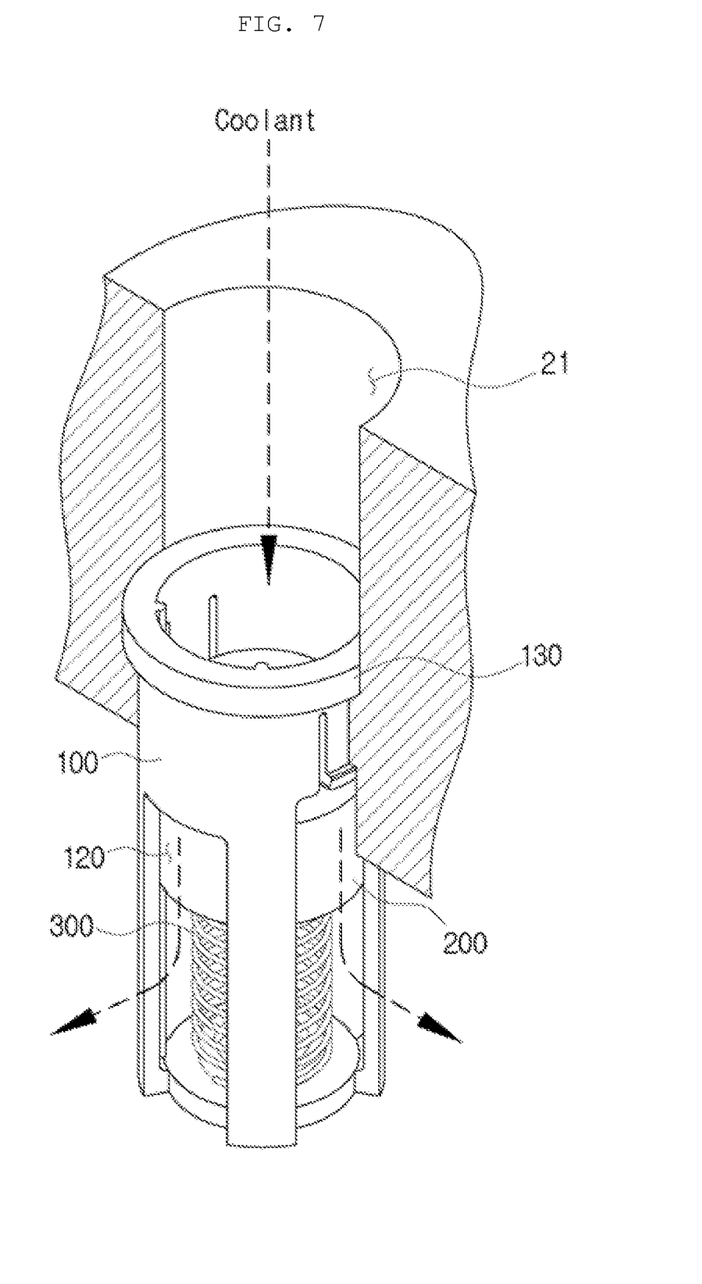
FIG. 7 is a diagram illustrating a flow of a coolant in a state in which the suction pulsation reduction apparatus according to the exemplary embodiment of the present invention is mounted on the suction channel.

As illustrated in FIGS. 4 to 6, the suction pulsation reduction apparatus 1 according to the exemplary embodiment of the present invention may further include a core guide 150 protruding inwardly in a predetermined region on the inner circumferential surface of the case 100 and extending from one side to the other side in the longitudinal direction and a guide moving groove 230 extending in a longitudinal direction on the outer circumferential surface of the core portion 200 at the position corresponding to the core guide 150 and depressed inwardly.

The core guide 150 prevents the core portion 200 from rotating or unstably moving in the rest directions other than the longitudinal direction within the case 100, that is, the movement in the axial direction, thereby easily controlling the opening/closing area of the inlet 110 and the outlet 120 of the case 100.

The number of core guides 150 may be one or may be two as illustrated in FIG. 4. In the disposition relationship with the core hook portion 140, on the outer circumferential surface of the core portion 200, the core guide 150 is preferably disposed at regular intervals at positions corresponding to each other with respect to the center of the core portion 200.

According to the exemplary embodiment, FIGS. 5 and 6 illustrate an example in which two core guides 150 are formed and one core hook portion 140 is formed, in which the core guide 150 and the core hook portion 140 are disposed at an interval of approximately 120°.

Figure 8:
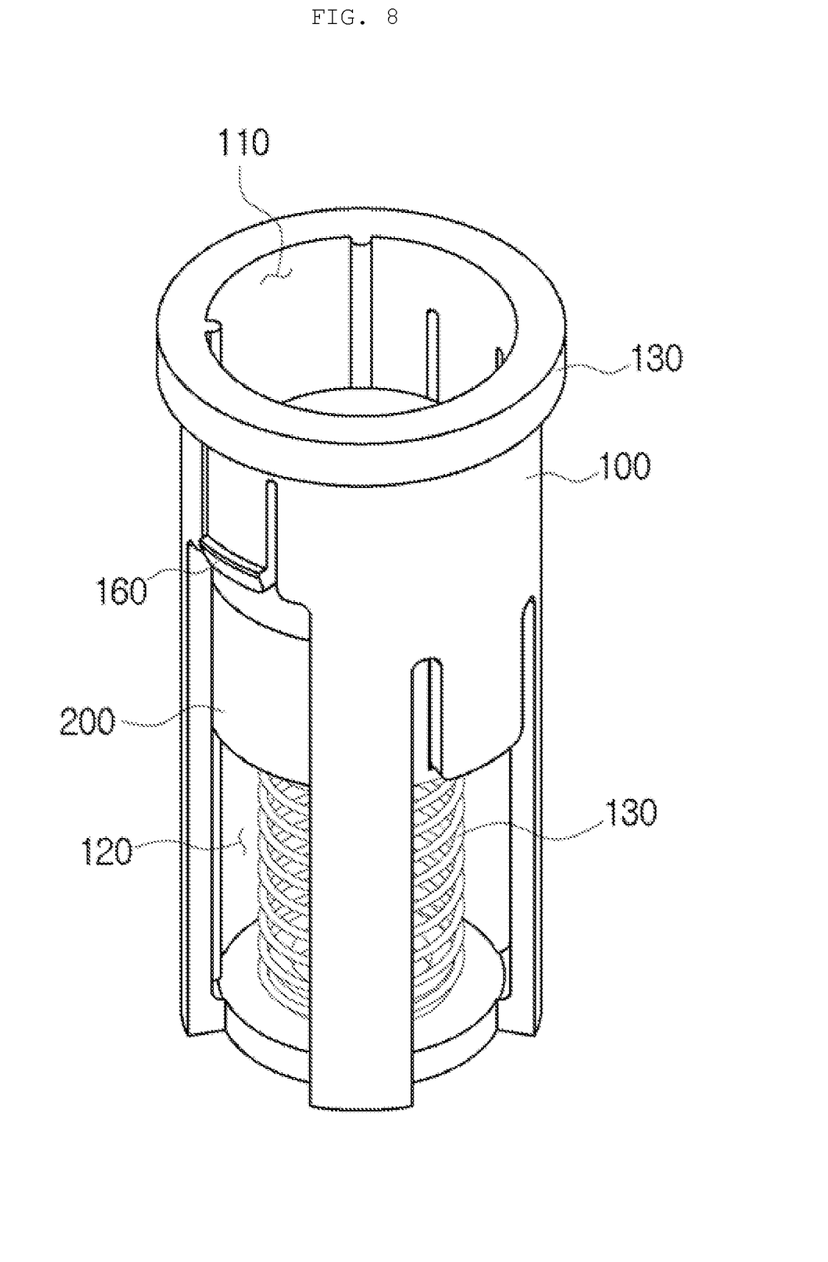
FIGS. 8 and 9 are a perspective view and a longitudinal perspective view illustrating a suction pulsation reduction apparatus according to another exemplary embodiment of the present invention.

Meanwhile, as illustrated in FIG. 8, the suction pulsation reduction apparatus 1 according to the exemplary embodiment of the present invention may include a body hook portion 160 which protrudes outwardly in a predetermined region on the outer circumferential surface of the case 100 and further protrudes gradually toward the inlet 110 side.

When the suction pulsation reduction apparatus 1 of FIG. 8 is inserted from the suction port 20 and is mounted, it is mounted in a snap-fit manner through the body hook portion 160 instead of the conventional press fitting manner and thus can be more easily assembled.

Figure 9:
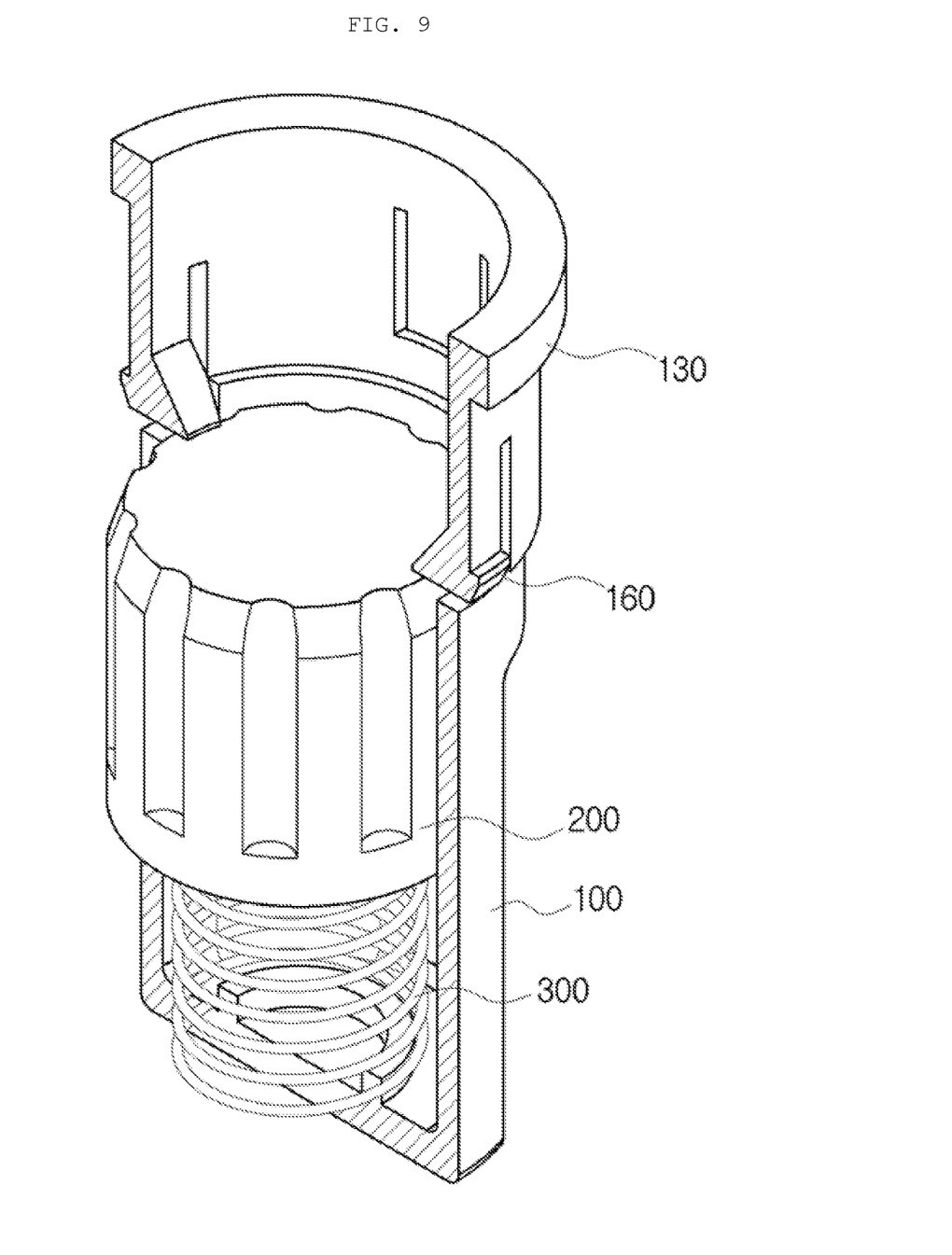
Figure 10:
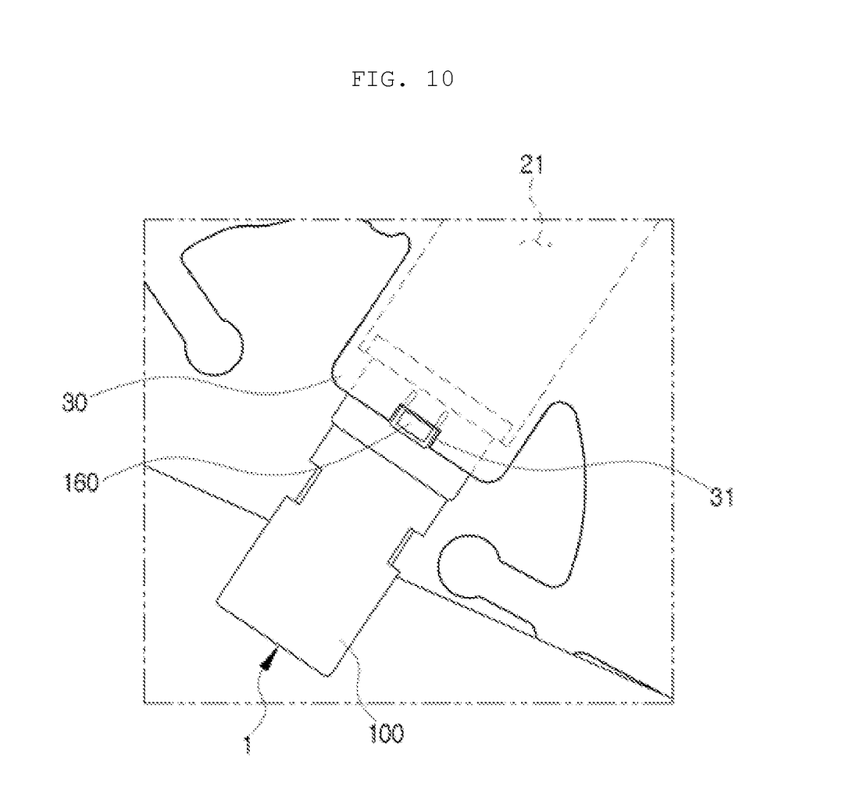
FIG. 10 is a perspective view illustrating a state in which the suction pulsation reduction apparatus of FIG. 8 is mounted on the suction channel.

In this case, in the suction pulsation reduction apparatus 1, the latching portion 130 is seated on the groove 30 protruding from the suction channel 21, and as illustrated in FIG. 9, the groove 30 at the position corresponding to the body hook portion 160 of the case 100 is provided with a hook latching portion 31 depressed inwardly, and thus the body hook portion 160 may be latched.

In this case, the suction pulsation reduction apparatus 1 may be prevented from unnecessarily rotating by the suction pressure of the coolant introduced from the suction port 20.

Figure 11:
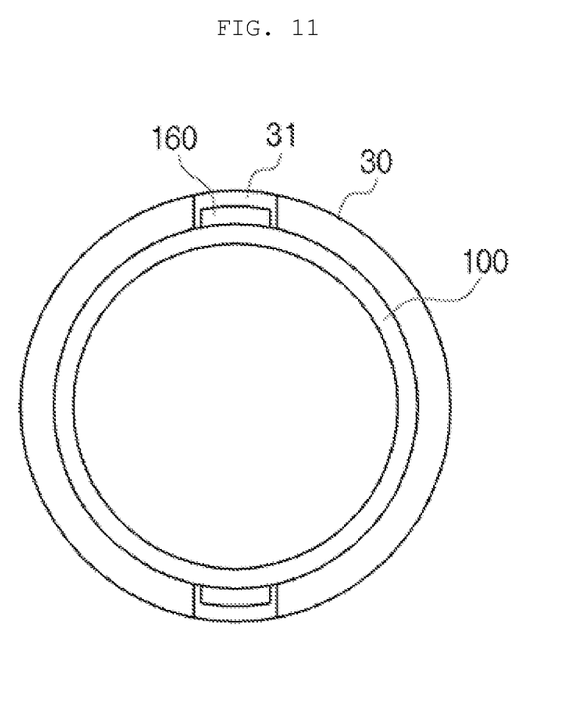
FIG. 11 is a plan view illustrating a groove of the suction channel on which the suction pulsation reduction apparatus is mounted.

As illustrated in FIG. 11, the body hook portion 160 and the hook coupling portion 31 may be formed in plural at regular intervals.

Therefore, according to the suction pulsation reduction apparatus 1 of the swash plate type compressor according to the present invention, the moving range of the core portion 200 is limited and the parts being mounted on the suction channel 21 are integrally formed in the case 100, thereby simplifying the structure and facilitating the assembling.

Further, according to the suction pulsation reduction apparatus 1 according to the exemplary embodiment of the present invention, the case 100 can be integrally manufactured by the plastic injection method to reduce the material and assembling costs, thereby reducing the costs.

More specifically, in the suction pulsation reduction apparatus 1 according to the exemplary embodiment of the present invention, even when the coolant is not sucked, the core portion 200 may be supported by the core hook portion 140 protruding inwardly on the inner circumferential surface of the case 100 without being separated from the case 100, and the edge of the end of the suction port 20 side of the case 100 may be seated on the groove 30 formed on the suction channel 21 by the latching portion 130 protruding outwardly, such that the case 100 can replace the role of the existing cover.

The present invention is not limited to the above-mentioned exemplary embodiments but may be variously applied, and may be variously modified by those skilled in the art to which the present invention pertains without departing from the gist of the present invention claimed in the claims.

DETAILED DESCRIPTION OF MAIN ELEMENTS

1: Suction pulsation reduction apparatus
10: Housing
21: Suction channel
30: Groove
31: Hook coupling portion
100: Case
110: Inlet
120: Outlet
130: Latching portion
140: Core hook portion
150: Core guide
160: Body hook portion
200: Core portion
210: Hook moving groove
220: Chamfer portion
230: Guide moving groove
300: Elastic spring

The invention claimed is:

1. A suction pulsation reduction apparatus provided on a suction channel formed in a rear head of a swash plate type compressor comprising:
   a case including an inlet located at a suction port side and having one side of the case opened in a longitudinal direction, an outlet formed by making a predetermined region on an outer circumferential surface hollow, and a latching portion protruding outwardly from the outer circumferential surface of an end part of the case;
   a core portion moving in the longitudinal direction in the case according to a suction pressure of a coolant introduced from the inlet to control an opening/closing area of the inlet;
   an elastic spring inserted into the case and seated on an other side surface of the case to elastically support the core portion,
   a core hook portion protruding inwardly in a predetermined region on an inner circumferential surface of the case; and
   a hook moving groove extending in the longitudinal direction on an outer circumferential surface of the core portion at a position corresponding to the core hook portion and depressed inwardly, wherein the hook moving groove extends from a point spaced by a predetermined distance from an other end of the core portion in the longitudinal direction, and wherein the core hook portion protrudes at a point spaced by a predetermined distance from the other end of the core portion in the longitudinal direction of the case, and the distance spaced from the other end of the core portion is equal to or shorter than a length of the hook moving groove.

2. The suction pulsation reduction apparatus of claim 1, wherein a predetermined region of one end of the core portion which is located at an inlet side of the case is provided with a chamfer portion formed to have a diameter gradually reducing.

3. The suction pulsation reduction apparatus of claim 1, wherein the case is integrally formed with the core hook portion by injection molding.

4. A swash plate type compressor including the suction pulsation reduction apparatus of claim 1,
   wherein the latching portion is seated on a groove protruding on the suction channel, and
   a body hook portion is latched to a hook coupling portion depressed into the groove at a position corresponding to the body hook portion of the case.

5. A suction pulsation reduction apparatus provided on a suction channel formed in a rear head of a swash plate type compressor, comprising:
   a case including an inlet located at a suction port side and having one side of the case opened in a longitudinal direction, an outlet formed by making a predetermined region on an outer circumferential surface hollow, and a latching portion protruding outwardly from the outer circumferential surface of an end part of the case;
   a core portion moving in the longitudinal direction in the case according to a suction pressure of a coolant introduced from the inlet to control an opening/closing area of the inlet;
   an elastic spring inserted into the case and seated on an other side surface of the case to elastically support the core portion,
   a core hook portion protruding inwardly in a predetermined region on an inner circumferential surface of the case;
   a hook moving groove extending in the longitudinal direction on an outer circumferential surface of the core portion at a position corresponding to the core hook portion and depressed inwardly;
   a core guide protruding inwardly in a predetermined region on the inner circumferential surface of the case and extending from one side to the other side in the longitudinal direction, and
   a guide moving groove extending in the longitudinal direction on an outer circumferential surface of the core portion at a position corresponding to the core guide and depressed inwardly;
   wherein the hook moving groove extends from a point spaced by a predetermined distance from an other end of the core portion in the longitudinal direction.

6. The suction pulsation reduction apparatus of claim 5, wherein the number of core guides and the number of core hook portions are at least one.

7. The suction pulsation reduction apparatus of claim 6, wherein the core guide and the core hook portion are disposed at positions corresponding to each other with respect to a center of the core portion on the outer circumferential surface of the core portion.

8. The suction pulsation reduction apparatus of claim 1, wherein the latching portion protrudes outwardly along the edge of one end of the case and protrudes while being spaced at regular intervals in a circumferential direction.

9. The suction pulsation reduction apparatus of claim 1, further comprising:
   a body hook portion protruding outwardly in a predetermined region on the outer circumferential surface of the case and further protruding gradually toward the inlet.

10. The suction pulsation reduction apparatus of claim 9, wherein the number of body hook portions is at least one.

\* \* \* \* \*